US006799494B1

(12) United States Patent  
Ricci et al.

(10) Patent No.: US 6,799,494 B1
(45) Date of Patent: Oct. 5, 2004

(54) MOUNTING BRACE FOR A JOURNAL TURNING LATHE

(75) Inventors: Donato L. Ricci, W8477 - 162$^{nd}$ Ave., Hager City, WI (US) 54017; Brent Place, Hager City, WI (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/679,904

(22) Filed: Oct. 6, 2003

(51) Int. Cl.$^7$ ................................................ B23B 5/14
(52) U.S. Cl. ........................................... 82/113; 82/46
(58) Field of Search .......................... 82/113, 46, 128; 83/743, 745, 947; 30/92, 95, 96; 409/138, 140; 269/287

(56) References Cited

U.S. PATENT DOCUMENTS

| | | | | |
|---|---|---|---|---|
| 2,869,411 A | * | 1/1959 | Duprat | 82/128 |
| 3,630,069 A | * | 12/1971 | White | 72/420 |
| 4,077,679 A | * | 3/1978 | Stock | 384/91 |
| 4,122,735 A | * | 10/1978 | Evers | 82/126 |
| 5,056,389 A | * | 10/1991 | Johnstead | 82/128 |
| 5,549,024 A | | 8/1996 | Ricci | |
| 5,660,093 A | | 8/1997 | Ricci | |
| 6,065,378 A | * | 5/2000 | Ricci | 82/128 |
| D436,606 S | | 1/2001 | Ricci | |

* cited by examiner

Primary Examiner—Willmon Fridie, Jr.
(74) Attorney, Agent, or Firm—Nikolai & Mersereau, P.A.; Thomas J. Nikolai

(57) ABSTRACT

The intermediate support brace is used to prevent bending or deflecting of a cylindrical work piece being machined by a journal turning lathe. A U-shaped frame is mounted to the journal turning lathe, and secured to the journal turning lathe by a first and second clamping means which secure the intermediate support brace to the guide rails of the journal turning lathe. A generally circular opening in the frame surrounds the cylindrical work piece, and the work piece is centered by a series of jacks. The clamshell lathe assembly is translated from a first end bracket to the intermediate support bracket. The clamshell lathe is then stopped; the intermediate support bracket is released and mounted downstream from the clamshell lathe assembly. The clamshell lathe assembly is then restarted and translated to a second end bracket.

35 Claims, 4 Drawing Sheets

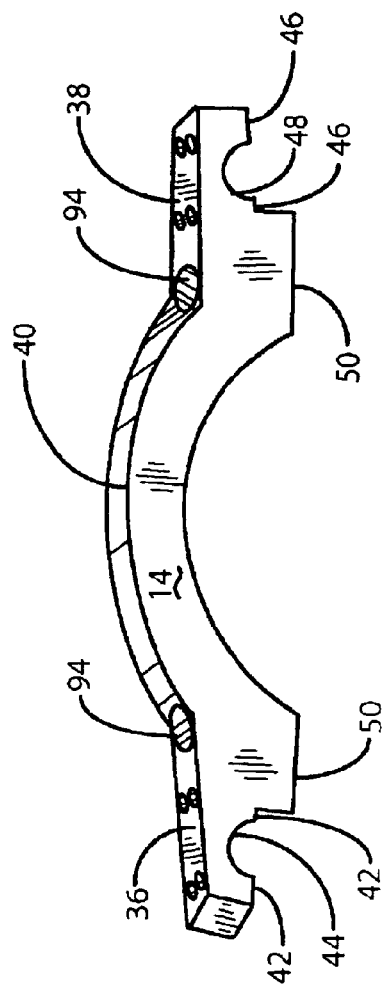
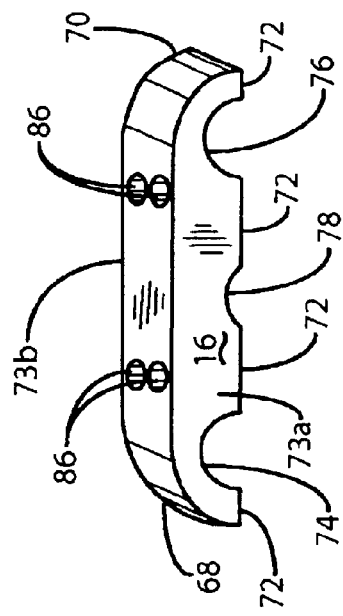
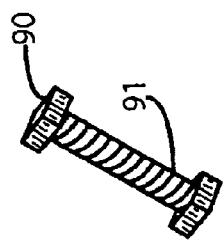
FIG. 4
FIG. 5
FIG. 6

MOUNTING BRACE FOR A JOURNAL TURNING LATHE

BACKGROUND OF THE INVENTION

1. Field of the Invention

This invention relates generally to a portable machining lathe, and in particular to a mechanism for preventing deflection of the guide rails of a journal turning lathe used for cutting and finishing relatively long spans of large diameter pipes.

2. Description of the Related Art

Split frame journal turning lathes of the type described herein are known in the art. The journal turning lathe generally comprises first and second end brackets which are concentrically mounted on a cylindrical work piece at a predetermined axial spacing. A plurality of guide rails extend between the first and second end brackets in parallel relations to the cylindrical work piece. The journal turning lathe assembly further has a relatively heavy clamshell lathe assembly having a first and second semicircular segments that are designed to be joined together to form an annular assembly for encircling a shaft or pipe to be machined. The assembly includes a stationary ring, and a rotatable ring abutting the stationary ring. The rotatable ring is made of steel and on its peripheral surface and is journaled to the stationary portion for rotation about a concentrically disposed pipe or shaft to be machined. A motor is attached to the stationary assembly and includes a drive gear designed to mesh with the spur gear on the rotatable segment of the pipe lathe. Also, a heavy tool block for supporting a cutting tool is mounted on the rotatable segment. The cutting tool is adapted to be advanced in incremental steps in a radial direction against the pipe to be machined upon each orbit of the ring gear about the work piece.

A problem has heretofore existed that the guide rails carrying the clamshell assembly may bend or deflect under the weight of the clamshell lathe assembly as the midpoint of the guide rails is approached. As the journal turning lathe progresses to the center of the cylindrical work piece, the weight of the lathe assembly causes the supporting structure to sag at the center. This sagging, in turn, results in uneven machining of the work piece. It is the purpose of this invention to remedy this problem.

SUMMARY OF THE INVENTION

The present invention comprises an intermediate support brace for a journal turning lathe for supporting the guide rails and cylindrical work piece. The support brace includes a somewhat U-shaped frame, and a first and second clamping member. The U-shaped frame has a series of semicircular notches cut into the surface of the frame along the thickness dimension thereof. The U-shaped frame is lifted onto the journal turning lathe, and the guide rails of the lathe are received in the concaved notches in the U-shaped frame. The clamping members each have a pair of corresponding inverted semicircular notches which are placed over the top half of each guide rail. The concaved notches of the frame cooperate with the inverted notches of the clamping members to encircle and trap the guide rails. The frame and first clamping member have a series of regularly spaced threaded apertures which locator members pass through to center the pipe in the frame.

The primary advantage of the present invention is that it provides support for the guide rails preventing any appreciable sag thereof due to the weight of the clamshell assembly of the journal turning lathe that are suspended on the guide rails.

Another feature of the present invention is that it is relatively easy to affix to and remove the support brace from the journal turning lathe to allow the clamshell assembly to traverse the entire length of the work piece being machined.

An additional advantage of the present invention is that it is portable and can be taken to a variety of job sites along with the journal turning lathe.

For a better understanding of the invention, and of the advantages obtained in its use, reference should be made to the drawings and the accompanying descriptive material, in which there is illustrated and described a preferred embodiment of the invention.

DESCRIPTION OF THE DRAWINGS

The foregoing features, objects and advantages of the invention will become apparent to those skilled in the art from the following detailed description of the preferred embodiment, especially when considered in conjunction with accompanying drawings in which like numerals in the several view refer to corresponding parts:

FIG. 4 is a perspective view of the first clamping member;

FIG. 5 is a perspective view of the second clamping member; and

FIG. 6 is a perspective view of the locator member for centering the work piece;

DETAILED DESCRIPTION OF THE INVENTION

Figure 1:
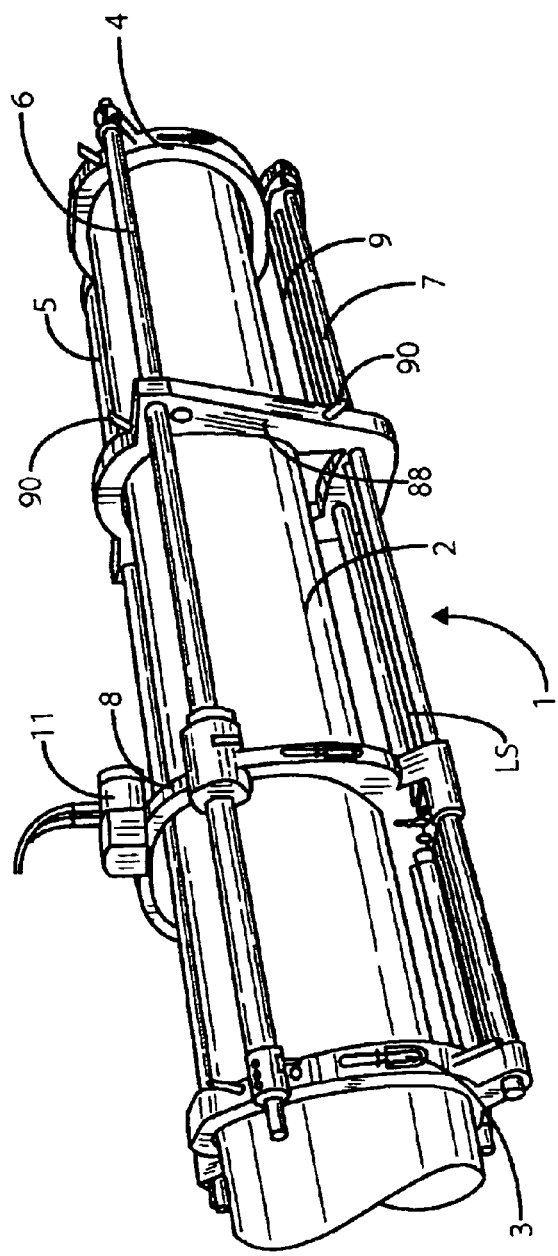
FIG. 1 is a perspective view of the present invention mounted on a journal turning lathe.

FIG. 1 shows a journal turning lathe 1 mounted on a shaft 2 whose exterior is to be machined. Journal turning lathe 1 includes end brackets 3 and 4 and a plurality of guide rails as at 5, 6, 7 and 9 extending between the end brackets and the parallel cylindrical work piece 2. A clamshell lathe 8 of the type described in the Ricci U.S. Pat. No. 5,549,024, which is hereby incorporated by reference, is supported by the elongated guide rails and is arranged to be axially driven there along by a motor driven lead screw LS. A second motor 11 is mounted on the stationary segment of the clamshell and drives the movable gear ring of the clamshell that carries a tool slide that holds a tool bit.

The present invention comprises an intermediate supporting brace for use with a conventional, prior art journal turning lathe. Referring to the perspective views in FIGS. 2 and 3, the supporting brace is indicated generally by numeral 10 and comprises a generally U-shaped frame 12 with a front wall 13a and a back wall 13b, a first clamping member 14, and a second clamping member 16. The generally U-shaped frame 12 has a base segment 18 and a pair of arms 20 and 22. On the first top edge surface 24 of the first arm segment 20 is a first concaved semi-circular notch 26 adapted to receive a lower half of a first cylindrical guide rail 5. The first concaved notch 26 is defined by the elevation of the top edge surface 24 and extends from the front wall 13a to the back wall 13b of the U-shaped frame 12. A first shoulder 28 is formed along the inside of the first arm segment 20 adjacent to the first concaved notch 26.

A corresponding structure is found on the top edge surface 30 of the second arm segment 22. A second concaved notch 32 is defined by the elevation of the second top edge surface 30. A second shoulder 34 is formed along the inside of the surface of the second arm segment 22 adjacent to the second concaved notch 32. The second concaved notch 32 is adapted to receive the lower half of a second guide rail 6 and is generally semi-circular in shape.

The first and second guide rails 5 and 6 are captured on the arms of the supporting brace 10 by applying the first or upper clamping device 14 atop the brace to span the first and second arm segments 20, 22. The first clamping member 14 is shown in FIG. 4. It has a first and second end portion 36 and 38. Between the first and second ends 36, 38 is a rounded arch segment 40 which is integral with the first and second end 36, 38. The first clamping member 14 has a front wall 41a and a back wall 41b. The bottom surface 42 has a first inverted semi-circular notch 44 formed inward thereof. Likewise, the bottom surface 46 of the second end 38 includes a second inverted semi-circular notch 48. Adjacent the bottom surfaces 42 and 46 is a flat 50 which supports the arch 40.

When the first clamping member 14 is placed on the U-shaped frame 12, the flats 50 rest upon the shoulder 28 and 34 of the first and second arm segment 20, 22. Thus, the first concaved notch 26 cooperates with the first inverted notch 44 to form a cylindrical bore or aperture 52. The second concaved notch 32 cooperates with the second inverted notch 48 to form a circular aperture 54. Aperture 52 encircles and captures a first guide rail 5 and aperture 54 encircles and captures a second guide rail 6. The first clamping member 14 combines with the U-shaped frame 12 to form a central opening for receiving a cylindrical work piece therethrough.

The base segment 18 of the generally U-shaped frame 12 has a third concaved semicircular notch 56 in its inside surface 58 adjacent to the first arm segment 20. The third concaved notch 56 is defined by the elevation of the first arm segment 20 and the inside surface 58. The third concaved notch 56 is adapted to receive a third guide rail 9 (FIG. 1). The third concaved notch 56 extends from the front wall 13a to the back wall 13b of the U-shaped frame 12. A fourth concaved notch 60 is disposed on the base segment 18 and is defined by the elevation of the inside surface 58 and the second arm segment 22. The fourth concaved semi-circular notch is 60 is adapted to receive a fourth guide rail 7. (FIG. 1). The fourth concaved notch 60 extends from the front wall 13a to the back wall 13b of the U-shaped frame 12. A fifth concaved notch 62 is defined by the elevation of the inside surface 58 between the third concaved notch 56 and the fourth concaved notch 60. The fifth concaved notch 62 is generally semicircular in shape and extends from the front wall 13a to the back wall 13b of the U-shaped frame.

Third and fourth guide rails of the journal turning lathe 1 are received by the third concaved notch 56 and the fourth concaved notch 60, respectively. The threaded drive screw shaft LS of the journal turning lathe 1 extends loosely through the fifth concaved notch 62. The third and fourth guide rails 7 and 9 are clamped in the U-shaped frame 12 by the second clamping member 16 when the two are bolted together.

Figure 2:
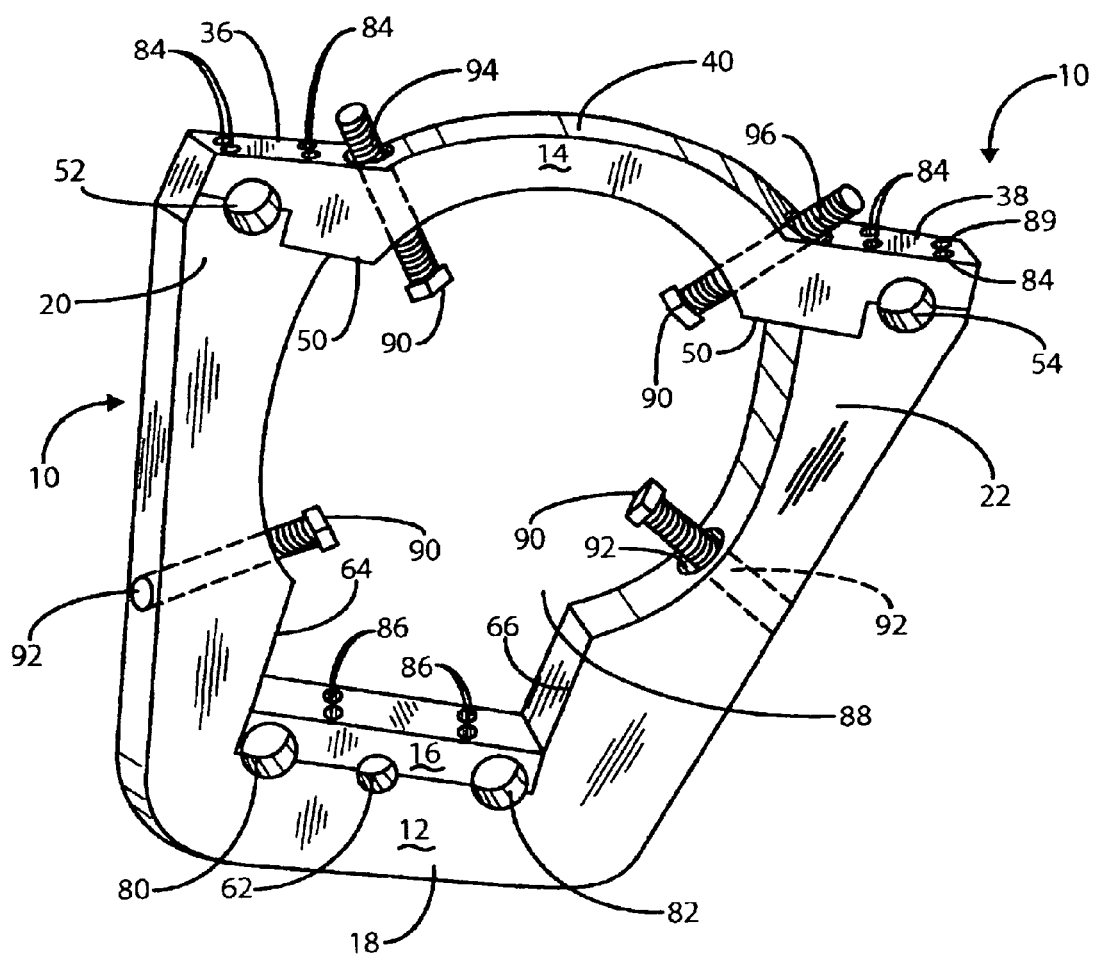
FIG. 2 illustrates a perspective view of the support brace in accordance with the present invention.
Figure 3:
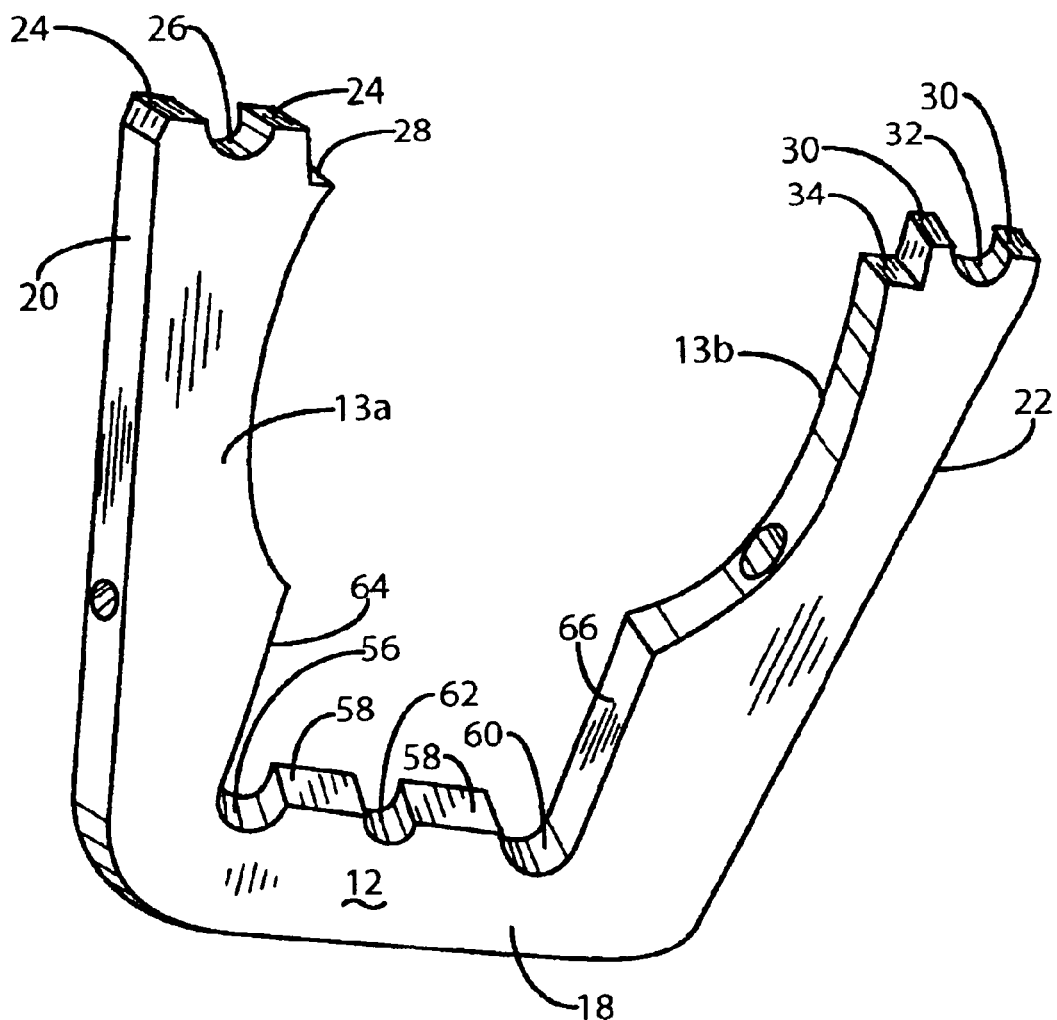
FIG. 3 is a perspective view of the U-shaped frame portion of the assembly in FIG. 1.

The second clamping member 16 (FIG. 5) extends lengthwise from the inside wall 64 (FIG. 3) of the first arm segment 20 and the inside wall 66 of the second arm segment 22. As shown in FIG. 2, the second clamping member 16 has a first end 68 adjacent to inside wall 64 and a second end 70 adjacent to inside wall 66. The second clamping member 16 further has a planar bottom surface 72, a front wall 73a and back wall 73b. A generally semicircular third inverted notch 74 is formed in the bottom surface 72 near the first end 68. Likewise, a generally semi-circular fourth inverted notch 76 is formed in the bottom surface 72 near the second end 70. Finally, a smaller inverted notch 78 is disposed midway between the third inverted notch 74 and the fourth inverted notch 76.

As seen in FIG. 2, when the second clamping member 16 is placed on the base of the U-shaped frame 12, the third inverted notch 74 cooperates with third concaved notch 56 to form circular bore 80 to encircle and capture the third guide rail 9 of the journal turning lathe 1. Likewise, fourth inverted notch 76 cooperates with the fourth concaved notch 60 to form a bore 82 to encircle and capture the guide rail 7. Finally, the drive shaft of the journal turning lathe is allowed to rotate in the bore created by the fifth concaved notch 62 in the frame base 12 and the fifth inverted notch 78.

The first clamping member 14 is secured to the upper ends of the U-shaped frame 12 by a first series of fasteners 84. The second clamping member 16 is secured to the to the base of the U-shaped frame 12 by a second series of fasteners 86.

The combination of the U-shaped frame 12 and the rounded arch 40 of the first clamping members 14 creates a central opening 88 (FIG. 1) adapted to receive the work piece to be machined. A plurality of jack pads 90 (FIGS. 1 and 6) are used to center the work piece in the supporting brace 10. The threaded shanks of jack pads 90 extend through a pair of threaded sidewall apertures 92 in the first and second arm segments 20, 22 of the U-shaped frame 12, and through a pair of threaded apertures 94 in the top of the first clamping member 14.

In use, the journal turning lathe 10 is first mounted on the work piece to be machined as shown in FIG. 1. The split clamshell lathe is positioned about the work piece adjacent to an end bracket 3 or 4. The support brace 12 is then releasably secured to the guide rails of the journal turning lathe at a predetermined location along the guide rails, preferably about half way between the two end brackets. The tool holder on the rotatable ring gear of the clamshell lathe is made to orbit the work piece as the clamshell is translated from a first position, adjacent to the first end bracket of the journal turning lathe, to a second position closely adjacent to the mounting brace 10. The clamshell lathe is then momentarily stopped, while the mounting brace 10 is removed from the journal turning lathe and repositioned on the journal turning lathe upstream of the clamshell lathe assembly. The clamshell lathe is then restarted and made to translate from the location proximate the mounting brace 10 to the second end bracket of the journal turning lathe. The process can be repeated on the return travel of the clamshell and on all subsequent passes.

Because of the presence of the mounting brace 10 operatively disposed between the work piece 2 and the plurality of journal turning lathe guide rails, the rails do not deflect under the weight of the clamshell assembly, resulting in a more perfect machining operation. In practice, the use of the movable brace 10 has permitted a shaft 8 feet long to be turned over its entire length while maintaining a tolerance of 0.004 inch. Even though numerous characteristics and advantages of the invention have been set forth in the foregoing description, together with details of the structure and function of the invention, the disclosure is illustrative only, and changes can be made in detail, specially in areas of shape, size, and arrangement of parts, within the principles of the invention, to the full extent indicated by the broad, general meaning of the appended claims.

What is claimed is:

1. In a journal turning lathe for machining a work piece, the journal turning lathe including a pair of end brackets adapted to be secured to a cylindrical work piece at axially spaced locations and a plurality of guide rails extending between and supported by the end brackets in parallel relation to the work piece, said guide rails supporting a clamshell assembly which is adapted to be translated along the guide rails by at least one motor driven lead screw, said clamshell assembly being the type having a rotatable ring operatively coupled to a stationary ring, the rotatable ring carrying a tool slide holding a tool bit for machining the cylindrical work piece, wherein the improvement comprises:

an intermediate support bracket adapted to be inserted between said guide rails and the work piece at a location displaced from the end brackets for inhibiting flexure of the guide rails as the clamshell is translated there along.

2. The journal turning lathe as in claim 1 wherein the intermediate support bracket comprises:
   a) a generally U-shaped frame having a base segment joining first and second upwardly extending arms;
   b) a first removable clamp member attachable to said first and second arms adapted to engage a first pair of said plurality of guide rails, and
   c) a second removable clamp member attachable to said base segment and adapted to engage a second pair of said plurality of guide rails.

3. The journal turning lathe in claim 2 and further including:
   a) a plurality of threaded bores formed radially through the first removable clamp member and through said first and second arms; and
   b) a plurality of threaded jack pads fitted individually into the threaded bores for centering the generally U-shaped frame on the cylindrical work piece.

4. The journal turning lathe as in claim 1 wherein:
   a) the first arm has a first top edge surface with a first concave notch adapted to receive a first guide rail of the journal turning lathe; and the second arm has a second top edge surface with a second concave notch adapted to receive a second guide rail of the journal turning lathe; and
   b) the base segment has a top surface having a third concave notch is disposed on a top surface of the base segment adjacent to the first arm for receiving a third guide rail of a journal turning lathe, a fourth concave notch disposed on the top surface of the base segment adjacent to the second arm, for receiving a fourth guide rail of the journal turning lathe, and a fifth concave notch disposed on the top surface of the base segment between the third and fourth concave notches.

5. The journal turning lathe as in claim 4 wherein the first clamp member has a first end and a second end, a front wall, a back wall, a top surface, and a bottom surface, and a length such that the first clamp member extends from an outer surface of the first arm to a an outer surface of the second arm, the first clamp member further having a first inverted notch disposed on the bottom surface of the first clamp member proximate the first end thereof and a second inverted notch disposed on the bottom surface of the first clamp member proximate the second end where the first inverted notch cooperates with the first concave notch to form a first bore for capturing the first guide rail, and the second inverted notch and the second concave notch cooperate to form a second bore for capturing a second guide rail.

6. The journal turning lathe in claim 4 wherein:
   a) the second clamp member has a first end and a second end, a front wall, a back wall, a top surface and a bottom surface, where the second clamp member extends between an inside surface of the first arm and an inside surface of the second arm, the second clamp member further having a third inverted notch on the bottom surface thereof proximate the first end and a fourth inverted notch on the bottom surface thereof proximate the second end where the third inverted notch cooperates with the third concave notch to form a third bore for capturing a third guide rail, and the fourth inverted notch cooperates with the fourth concave notch to form a fourth bore for capturing the fourth guide rail, and a fifth concave notch disposed between the third and fourth inverted notches cooperates with the fifth concave notch to loosely surround a drive shaft of the journal turning lathe with a predetermined clearance; and
   b) jack pads adjustably disposed in threaded bores formed radially though the U-shaped frame and first clamp member though for concentrically mounting the intermediate mounting brace on the cylindrical work piece.

7. The journal turning lathe as in claim 2 where the base segment is integral with the first and second upwardly extending arm segments.

8. The journal turning lathe as in claim 4 where the first concave notch is formed inwardly in of the first top edge surface.

9. The journal turning lathe as in claim 4 where the first, second, third and fourth concave notch is generally semi-circular in shape.

10. The journal turning lathe as in claim 4 where the first, second, third and fourth concave notch extends from a front wall to a back wall of the U-shaped frame.

11. The journal turning lathe as in claim 4 where the second concave notch is formed inward of the second top edge surface.

12. The journal turning lathe as in claim 4 where the third concave notch is formed inward of the top surface of the base segment adjacent the first arm segment.

13. The journal turning lathe as in claim 4 where the fourth concave notch is formed inward of the top surface of the base segment adjacent the second arm segment.

14. The journal turning lathe as in claim 4 where the fifth concave notch is generally semi-circular in shape.

15. The journal turning lathe as in claim 4 wherein the fifth concave notch is formed inward of the top surface of the base segment and extends from a front wall to a back wall of the U-shaped frame.

16. The journal turning lathe as in claim 5 where the first clamp member has a rounded arch between the first and second ends.

17. The journal turning lathe as in claim 16 where the rounded arch is integral with the first and second end of the first clamp member.

18. The journal turning lathe as in claim 5 where the first clamp member has an abutment for resting the first clamp member on the U-shaped frame.

19. The journal turning lathe as in claim 18 where the abutment rests on a first and second shelf integrated with the first and second arm segment, respectively.

20. The journal turning lathe as in claim 5 where the first and second inverted notches are formed inward of a bottom surface of the first clamp member extend from the front wall to the back wall and are generally semi-circular in shape.

21. The journal turning lathe as in claim 6 where the third inverted notch is generally semi-circular in shape, is formed inward of the bottom surface of the second clamp member.

22. The journal turning lathe as in claim 21 where the third inverted notch extends from the front wall to the back wall of the second clamp member.

23. The journal turning lathe as in claim 6 where the fourth inverted notch is generally semi-circular in shape, is formed inward of the bottom surface of the second clamp member and extends from the front wall to the back wall of the second clamp member.

24. An intermediate support brace for a journal turning lathe for machining a cylindrical work piece, the journal turning lathe being of a type including a pair of end brackets adapted to be secured to the cylindrical work piece and a plurality of guide rails extending between the end brackets in parallel relation to the cylindrical work piece, said guide rails supporting a clamshell assembly that is adapted to be translated along the guide rails by at least one motor driven lead screw, said clamshell assembly having a rotatable ring operatively coupled to a stationary ring, the rotatable ring carrying a tool slide holding a tool bit for machining the cylindrical work piece, wherein the support brace comprises:

a) a generally U-Shaped frame having a first and second of upwardly extending arm segments joined by a base segment where
      i) the first arm segment has a first top edge surface with a first concave notch adapted to receive a bottom surface of a first guide rail of the journal turning lathe;
      ii) the second arm segment has a second top edge surface with a second concave notch adapted to receive a second guide rail of the journal turning lathe;
      iii) the base segment has a top surface where a third concave notch is disposed on the top surface of the base segment adjacent to the first arm segment for receiving the bottom surface of a third guide rail of a journal turning lathe, a fourth concave notch is disposed on the top surface of the base segment adjacent to the second arm segment, for receiving the bottom surface of a fourth guide rail, and a fifth concave notch disposed on the top surface of the base segment between the third and fourth concave notches;
   b) a first and second clamp member where:
      i) the first clamp member has a first end and a second end, a front wall, a back wall, a top surface, and a bottom surface, where the first clamp member extends from an outer surface of the first arm segment to a an outer surface of the second arm segment, the first clamp member further having a first inverted notch disposed on the bottom surface of the first clamp member proximate the first end and a second inverted notch disposed on the bottom surface of the first clamp member proximate the second end where the first inverted notch cooperates with the first concave notch to form a first bore for capturing the first guide rail, and the second inverted notch and the second concave notch cooperate to form a second bore for capturing a second guide rail,
      ii) the second clamp member has a first end and a second end, a front wall, a back wall, a top surface and a bottom surface, where the second clamp member extends between an inside surface of the first arm segment and an inside surface of the second arm segment, the second clamp member further having a third inverted notch on the bottom surface thereof proximate the first end and a fourth inverted notch on the bottom surface thereof proximate the second end where the third inverted notch cooperates with the third concave notch to form a third bore for capturing a third guide rail, and the fourth inverted notch cooperates with the fourth concave notch to form a fourth bore for capturing the fourth guide rail, and a fifth concave notch disposed between the third and fourth inverted notches cooperates with the fifth concave notch to surround a drive shaft of the journal turning lathe with a predetermined clearance; and
   c) adjustable jack pads disposed in threaded bores formed radially though the U-shaped frame and first clamp member for concentrically mounting the intermediate mounting brace on the cylindrical work piece.

25. The intermediate support brace in claim 24 where the base segment is integral with the first and second upwardly extending arm segments.

26. The intermediate support brace in claim 24 where the first concave notch is formed inwardly in of the first top edge surface, is generally semi-circular in shape, and extends from a front wall to a back wall of the U-shaped frame.

27. The intermediate support brace in claim 24 where the second concave notch is formed inward of the second top edge surface, extends from a front wall to a back wall of the U-shaped frame, and is generically semi-circular in shape.

28. The intermediate support brace in claim 24 wherein the third concave notch is generally semi-circular in shape, is formed inward of the top surface of the base segment adjacent the first arm segment, and extends from a front wall to a back wall of the U-shaped frame.

29. The intermediate support brace in claim 24 where the fourth concave notch is generally semi-circular in shape, is formed inward of the top surface of the base segment adjacent the second arm segment, and extends from a front wall to a back wall of the U-shaped frame.

30. The intermediate support brace in claim 24 where the first clamp member has a rounded arch between the first and second ends.

31. The intermediate support brace in claim 30 where the rounded arch is integral with the first and second end of the first clamp member.

32. The intermediate support brace in claim 24 where the first clamp member has an abutment for resting the first clamp member on the U-shaped frame.

33. The intermediate support brace in claim 32 where the abutment rests on a first and second shelf integrated with the first and second arm segment, respectively.

34. A method of machining a cylindrical work piece in situ comprising the steps of:
   a) providing a journal turning lathe of the type including first and second end brackets adapted to be concentrically mounted on the cylindrical work piece with a predetermined axial spacing therebetween, a plurality of guide rails extending between the first and second end brackets in parallel relation to the cylindrical work piece, a motor driven clamshell lathe assembly slidably mounted on and supported by the plurality of guide rails, and means for translating the clamshell lathe assembly axially along said guide rails;
   b) mounting the journal turning lathe on the cylindrical work piece with the clamshell lathe assembly positioned proximate to the first end bracket;

c) providing an intermediate support bracket having a central opening adapted to receive the cylindrical work piece therethrough, the support bracket including a plurality of jack pads for centering the intermediate support bracket on the cylindrical work piece and clamping means for releasably securing the intermediate support bracket onto said plurality of guide rails at a predetermined location along said guide rails;

d) concentrically mounting the intermediate support bracket on the cylindrical work piece at said predetermined location;

e) clamping the intermediate support bracket to the plurality of guide rails;

f) translating the clamshell lathe assembly from said position proximate the first end bracket;

g) stopping translation of the clamshell late assembly at a position immediately adjacent the intermediate support bracket;

h) removing the intermediate support bracket from the cylindrical work piece and repositioning the intermediate support bracket on said cylindrical work piece immediately upstream of the clamshell lathe assembly; and i) resuming translation of the clamshell lathe assembly to a position proximate the second end bracket.

35. A method of machining a cylindrical work piece in situ comprising the steps of:

a) providing a journal turning lathe of the type including first and second end brackets adapted to be concentrically mounted on the cylindrical work piece with a predetermined axial spacing therebetween, a plurality of guide rails extending between the first and second end brackets in parallel relation to the cylindrical work piece, a motor driven clamshell lathe assembly slidably mounted on and supported by the plurality of guide rails, and means for translating the clamshell lathe assembly axially along said guide rails;

b) mounting the journal turning lathe on the cylindrical work piece with the clamshell lathe assembly positioned proximate to the first end bracket;

c) providing a first and second intermediate support bracket having a central opening adapted to receive the cylindrical work piece therethrough, the support bracket including a plurality of jack pads for centering the intermediate support bracket on the cylindrical work piece and clamping means for releasably securing the intermediate support bracket onto said plurality of guide rails at a predetermined location along said guide rails;

d) concentrically mounting the first intermediate support bracket on the cylindrical work piece at said predetermined location;

e) clamping the first intermediate support bracket to the plurality of guide rails;

f) translating the clamshell lathe assembly from said position proximate the first end bracket;

g) stopping translation of the clamshell lathe assembly at a position immediately adjacent the intermediate support bracket;

h) concentrically mounting the second intermediate support bracket on the cylindrical work piece immediately upstream of the clamshell lathe assembly;

i) clamping the second intermediate support bracket to the plurality of guide rails;

j) removing the first intermediate support bracket from the cylindrical work piece; and j) resuming translation of the clamshell lathe assembly to a position proximate the second end bracket.

* * * * *